United States Patent
Kim et al.

(10) Patent No.: US 9,655,116 B2
(45) Date of Patent: *May 16, 2017

(54) METHOD FOR CHANNEL SWITCHING IN WIRELESS COMMUNICATION SYSTEM AND APPARATUS THEREFOR

(75) Inventors: Suhwook Kim, Anyang-si (KR); Bonghoe Kim, Anyang-si (KR); Jaewon Lim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/233,125

(22) PCT Filed: Jul. 19, 2012

(86) PCT No.: PCT/KR2012/005785
§ 371 (c)(1),
(2), (4) Date: Jan. 15, 2014

(87) PCT Pub. No.: WO2013/012272
PCT Pub. Date: Jan. 24, 2013

(65) Prior Publication Data
US 2014/0148100 A1   May 29, 2014

Related U.S. Application Data

(60) Provisional application No. 61/510,036, filed on Jul. 20, 2011.

(51) Int. Cl.
*H04W 16/14* (2009.01)
*H04W 72/04* (2009.01)
(Continued)

(52) U.S. Cl.
CPC ....... *H04W 72/0453* (2013.01); *H04W 4/008* (2013.01); *H04W 72/0406* (2013.01); *H04W 84/20* (2013.01)

(58) Field of Classification Search
CPC ..... H04W 48/08; H04W 36/00; H04W 16/14; H04W 72/04; H04W 72/02; H04L 67/12
See application file for complete search history.

(56) References Cited

U.S. PATENT DOCUMENTS 7,974,299 B1   7/2011  Banerjea et al.
2002/0060995 A1*  5/2002  Cervello ............... H04W 72/02
                                                                 370/332

(Continued)

FOREIGN PATENT DOCUMENTS

EP         2693805         2/2014
KR     1020050040220       5/2005

(Continued)

OTHER PUBLICATIONS

Extended-channel-switch-announcement—Nov. 2006.*

(Continued)

*Primary Examiner* — Cindy Trandai
(74) *Attorney, Agent, or Firm* — Lee, Hong, Degerman, Kang & Waimey

(57) ABSTRACT

The present invention provides a method for switching an operating channel of a device in a wireless personal area network (WPAN) system, and an apparatus therefor. Specifically, the method includes the steps of: setting an association with a first frequency band coordinator; receiving channel switching information from the first frequency band coordinator; channel switching to a second frequency-band channel using the received channel switching information; and setting an association with a second frequency band coordinator, wherein the channel switching information includes a residual time with a time limit which channel switches from a first frequency band to a second frequency band, an operating channel in the second frequency band, (Continued)

and a prearranged transmission time of a beacon frame in the operating channel in the second frequency band.

2 Claims, 14 Drawing Sheets

(51) Int. Cl.
*H04W 4/00* (2009.01)
*H04W 84/20* (2009.01)

(56) References Cited

U.S. PATENT DOCUMENTS

| | | |
|---|---|---|
| 2003/0002456 A1 | 1/2003 | Soomro et al. |
| 2004/0022219 A1* | 2/2004 | Mangold et al. ............ 370/336 |
| 2004/0185861 A1* | 9/2004 | Domon ................ H04W 72/02 455/450 |
| 2005/0053015 A1* | 3/2005 | Jin ........................ H04W 74/02 370/254 |
| 2005/0128982 A1 | 6/2005 | Kitchin |
| 2005/0272403 A1* | 12/2005 | Ryu et al. ..................... 455/403 |
| 2009/0129359 A1* | 5/2009 | Lee et al. ..................... 370/342 |
| 2009/0248829 A1* | 10/2009 | Habetha et al. ............. 709/208 |
| 2009/0323608 A1 | 12/2009 | Adachi et al. |
| 2010/0046455 A1 | 2/2010 | Wentink et al. |
| 2010/0075704 A1* | 3/2010 | McHenry ............. H04W 16/14 455/509 |
| 2010/0202354 A1* | 8/2010 | Ho ........................ G06Q 10/06 370/328 |
| 2011/0019104 A1* | 1/2011 | Kwak .................. H04W 16/14 348/731 |
| 2011/0026481 A1 | 2/2011 | Takamatsu |
| 2013/0017791 A1* | 1/2013 | Wang .................. H04W 16/14 455/41.2 |
| 2013/0023215 A1* | 1/2013 | Wang .................. H04W 16/14 455/41.2 |

FOREIGN PATENT DOCUMENTS

| | | |
|---|---|---|
| WO | 2008/051049 | 5/2008 |
| WO | 2010018518 | 2/2010 |
| WO | 2012/141440 | 10/2012 |

OTHER PUBLICATIONS

Kim, et al., "Multi-Dimensional Channel Management Scheme to Avoid Beacon Collision in LR-WPAN," IEEE Transactions on Consumer Electronics, vol. 54, No. 2, XP011229910, May 2008, 10 pages.
Kim, "Final Proposal for 802.15.4j MBANS, Project: IEEE P802.15 Working Group for Wireless Personal Area Networks (WPANs)," IEEE 802.15-11-0472-01-004j, XP068041204, Jul. 2011, 14 pages.
Kim, "Final Proposal for IEEE 802.15.4j MBAN," IEEE P802.15 Working Group for Wireless Personal Area Networks (WPANs), IEEE P802.15-11-0473-01-004j, XP068041206, Jul. 2011, 22 pages.
Yun, et al., "A Channel switching scheme for avoiding interference of between IEEE 802.15.4 and other networks," 2008 International Multi-Symposiums on Computer and Computational Sciences, XP031411024, Oct. 2008, 4 pages.
European Patent Office Application Serial No. 12814579.4, Search Report dated Feb. 26, 2015, 11 pages.
PCT International Application No. PCT/KR2012/005785, Written Opinion of the International Searching Authority dated Jan. 2, 2013, 15 pages.
Evans, "Proposal in Response to Task Group 802.15.4j Call for Proposal," IEEE 802.15-11-0341-01-004J, XP68041066A, May 2011, 12 pages.
European Patent Office Application Serial No. 12814579.4, Search Report dated Feb. 8, 2016, 8 pages.

* cited by examiner (a)  (b)

FIG. 5

| Octet : 2 | 1 | 4/10 | 0/5/6/10/14 | 2 | Variable | Variable | Variable | 2 |
|---|---|---|---|---|---|---|---|---|
| Frame Control | Sequence Number | Addressing Fields | Auxiliary Security header | Superframe Specification | GTS fields | Pending address fields | Beacon Payload | FCS |
| 501 | 503 | 505 | 507 | 509 | 511 | 513 | 515 | 517 |
| MHR | | | | MAC payload | | | | MFR |

METHOD FOR CHANNEL SWITCHING IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/005785, filed on Jul. 19, 2012, which claims the benefit of U.S. Provisional Application Ser. No. 61/510,036, filed on Jul. 20, 2011, the contents of which are hereby incorporated by reference herein in their entirety.

FIELD OF THE INVENTION

The present invention relates to a wireless communication system and, more particularly, to a method for switching channels in which a device is operated in a WPAN (Wireless Personal Area Network) system and an apparatus supporting the same.

BACKGROUND ART

Personal mobile devices may establish LR-WPAN (Low-Rate Wireless Personal Area Networks), so as to perform communication. An example of the LR-WPAN may include a network following the IEEE 802.15.4 standard. The IEEE 802.15.4 standard uses BPSK (binary phase-shift keying) in a 868/915 MHz band, so as to provide a transmission rate of 20 Kbps and 40 Kbps, and the IEEE 802.15.4 standard uses O-QPSK (offset quadrature phase-shift keying) in a 2.45 GHz band, so as to provide a transmission rate of 250 Kbps. The IEEE 802.15.4b standard may also use O-QPSK in an 868/915 MHz band, so as to provide a transmission rate of 250 Kbps.

As one of the networks, among the networks following the IEEE 802.15.4 standard, an MBAN (Medical Body Area Network) system has been designed to provide a flexible platform for wireless networking of other sensors, which are used for monitoring biological data of patients in a health care facility, such as a hospital.

The MBAN system operates in a 2360~2400 MHz band based upon an IEEE 802.15.4j, and a maximum emission bandwidth is limited to 5 MHz.

In case the MBAN system is operated in the 2360~2390 MHz band, a transmission power of the MBAN system may correspond to a lower value of 1 mW and 10*log(B) dBm. Herein, B corresponds to a 20 dB emission bandwidth. And, in case the MBAN system is operated in the 2390~2400 MHz band, a lower value of 20 mW and 10*log(B) dBm, Herein, B corresponds to a 20 dB emission bandwidth.

Since 2360~2400 MHz corresponds to a frequency band already allocated to another wireless communication system, the MBAN system is operated based upon a cognitive radio technology. The cognitive radio technology refers to a communication technology allowing a network or wireless communication device to actively detect and determine its surrounding communication environment, so as to adaptively change transmission/reception characteristics, such as a frequency band for an optimal communication, transmission power, encoding method, and so on. At this point, when a cognitive radio device detects the usage of another licensed user/primary user in a frequency band the corresponding cognitive radio device intends to use, the device prioritizes its operation by using a method that does not interfere with (or interrupt) the communication of the corresponding users.

In order to do so, when the MBAN is operated in the 2360~2390 MHz band, as a rule, the MBAN devices are operated inside of a registered health care facility. In case the MBAN devices are moved outside of the facility, the operation of the devices should be stopped, or transmission should be performed by changing the transmission band to the 2390~2400 MHz band, which is used as the basic band. More specifically, the usage of 2360~2390 MHz should be limited in accordance with a cooperation between the licensed users, and, when other licensed users use the corresponding based, all operations in this band should be initialized, and the operations should be resumed by newly using the 2390~2400 MHz band. In some cases, the operations may be resumed by performing channel switch to another channel within the 2360~2390 MHz band instead of the 2390~2400 MHz band. Conversely, in case the MBAN devices are operated in 2390~2400 MHz, the MBAN devices may be used without limitation both inside and outside of the facility.

A procedure for switching channels to another band from a channel currently being used in any one of the 2360~2390 MHz band and the 2390~2400 MHz, when the above-described specific situation occurs, and the related frame are yet to be defined in the conventional MBAN system.

DETAILED DESCRIPTION OF THE INVENTION

Technical Objects

An object of the present invention is to propose a method for easily transmitting and receiving data between a coordinator and a device in a wireless communication system, and, preferably, in a WPAN (Wireless Personal Area Network) system and a device for the same.

Additionally, an object of the present invention is to propose a method for easily switching an operating channel of a device without having to perform a scanning operation on all channels of a channel band to which the device is switched and a device for the same.

Furthermore, an object of the present invention is to propose a method for more efficiently using radio resources and a device for the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, in a method for switching an operating channel of a device in a WPAN (Wireless Personal Area Network) system, a channel switching method includes the steps of setting up an association with a coordinator of a first frequency band, receiving channel switching information from the coordinator of the first frequency band, channel switching to a channel of a second frequency band by using the received channel switching information, and setting up an association with a coordinator of a second frequency band, wherein the channel switching information includes a remaining time until a time point, at which channel switching is performed from the first frequency band to the second frequency band, an operating channel in the second frequency band, and a prearranged transmission time point of a beacon frame in the operating channel in the second frequency band.

In another aspect of the present invention, in a device switching an operating channel of a device in a WPAN (Wireless Personal Area Network) system, the device includes an RF (Radio Frequency) unit configured to transmit and receive radio signals, and a processor configured to set up an association with a coordinator of a first frequency band, to receive channel switching information from the coordinator of the first frequency band, to channel switch to a channel of a second frequency band by using the received channel switching information, and to set up an association with a coordinator of a second frequency band, and wherein the channel switching information includes a remaining time until a time point, at which channel switching is performed from the first frequency band to the second frequency band, an operating channel in the second frequency band, and a prearranged transmission time point of a beacon frame in the operating channel in the second frequency band.

Preferably, channel switching information is requested to the coordinator of the first frequency band, wherein the channel switching information is transmitted through a Channel switching parameter response frame as a response to the request for the channel switching information.

The channel switching information is transmitted through a beacon frame.

The channel switching information is transmitted through a Channel switch notification command.

The channel switching information further includes address information of the coordinator of the second frequency band or a PAN (Personal Area Network) identifier of the coordinator of the second frequency band.

The first frequency band corresponds to a frequency band ranging from 2390 MHz to 2400 MHz, and the second frequency band corresponds to a frequency band ranging from 2360 MHz to 2390 MHz.

Effects of the Invention

According to an exemplary embodiment of the present invention, data may be easily transmitted and received between a coordinator and a device in a wireless communication system, and, preferably, in a WPAN system.

Additionally, according to an exemplary embodiment of the present invention, an operating channel of a device may be easily switched without having to perform a scanning operation on all channels of a channel band to which the device is switched.

Furthermore, according to an exemplary embodiment of the present invention, radio resources may be more efficiently used.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are being included as a part of the detailed description of the present invention in order to facilitate the understanding of the present invention, provide exemplary embodiment(s) of the present invention and also describe the technical characteristics of the present invention along with the detailed description of the present invention.

FIG. 5 illustrates an example of a beacon frame format of the IEEE 802.15.4 system.

MODE FOR CARRYING OUT THE PRESENT INVENTION

Figure 1:
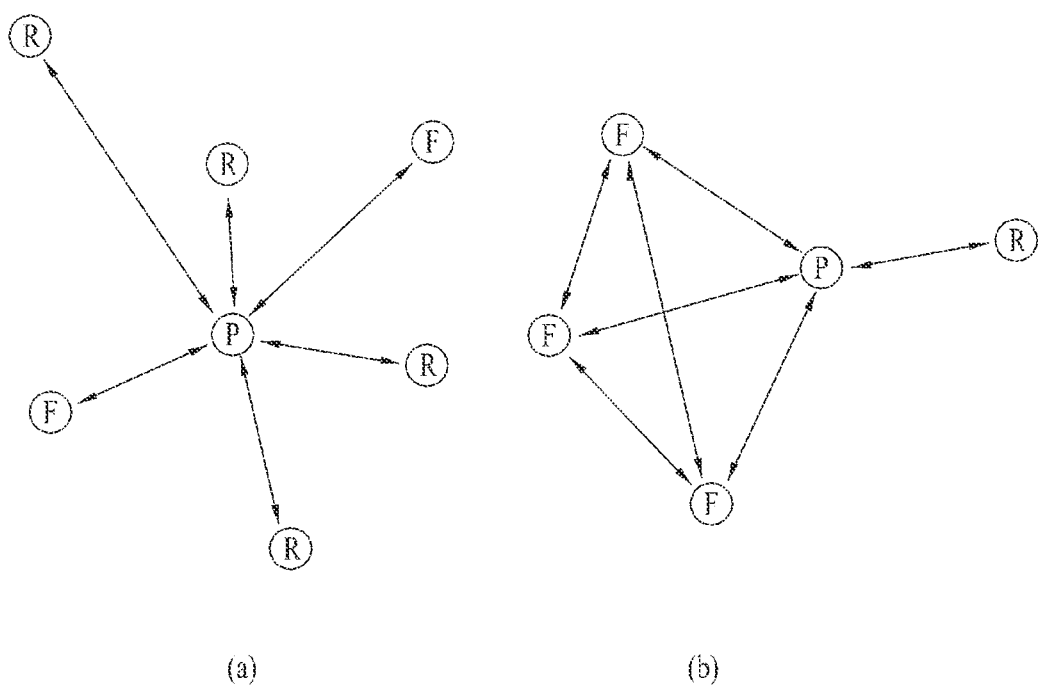
FIG. 1 illustrates a Network Topology according to an IEEE 802.15.4 system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

The specification of the present invention mainly describes the exemplary embodiments of the present invention based upon the data-transmission and data-reception relation between a base station and a terminal. Herein, the base station has its significance as a terminal node of a network directly performing communication with the terminal. In the description of the present invention, specific operations described to be performed by the base station may also be, in some occasion, performed by an upper node of the base station. More specifically, it will be apparent that, in a network configured of multiple network nodes, a variety of operations performed in the network in order to communicate with the terminal may be performed by the base station or by other network nodes that do not belong to the base station. At this point, the term 'Base Station (BS)' may also be replaced with other terms, such as a fixed station, Node B, eNode B (eNB), Access Point (AP), coordinator, PAN coordinator (Personal Area Network coordinator), MBAN coordinator (Medical Body Area Network coordinator), a PAN MBAN coordinator, and so on. Furthermore, the term 'Terminal' may be replaced with other terms, such as UE (User Equipment), MS (Mobile Station), MSS (Mobile Subscriber Station), SS (Subscriber Station), AMS (Advanced Mobile Station), MTC (Machine-Type Communication) device, M2M (Machine-to-Machine) device, D2D (Device-to-Device) device, a FFD (Full Function Device), an RFD (Reduced Function Device), and so on.

The specific terms used in the description of the present invention are merely provided to help and facilitate the understanding of the present invention. The usage of such term may vary within the technical scope and spirit of the present description.

The exemplary embodiments of the present invention may be supported by the standard documents that are disclosed in at least any one of the diverse wireless access systems, such as an IEEE 802 system, a 3GPP system, 3GPP LTE and LTE-A (LTE-Advanced) systems, and a 3GPP2 system. More specifically, among the exemplary embodiments of the present invention, the description of obvious process steps or elements of the present invention that have not been described herein may be supported by the above-mentioned documents in order to clearly disclose the technical spirit of the present invention. Furthermore, all of the terms mentioned in the description of the present invention may be described and defined with reference to the standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.15, IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

Hereinafter, for the clarity in the description of the present invention, the present invention will be described based upon the IEEE 802.15.4 system. Nevertheless, the scope and spirit of the present invention will not be limited only to those of the IEEE 802.15.4 system.

1. IEEE 802.15.4 System to Which the Present Invention Can Be Applied

FIG. 1 illustrates a Network Topology according to an IEEE 802.15.4 system.

Two different types of devices, such as a Full Function Device (FFD) and a Reduced Function Device (RFD), may be involved (or participate) in a network according to the IEEE 802.15.4 system. Therefore, the topology of the network according to the IEEE 802.15.4 system may be decided based upon the functions of the devices participating in the corresponding network.

(a) of FIG. 1 shows an example of a star topology, and (b) of FIG. 1 shows an example of a peer-to-peer topology.

The FFD corresponds to a device that can perform all functions, e.g., the FFD may perform communication with an FFD or RFD, and the FFD may also other functions, such as network initialization, node management, node information storage, and so on. Most particularly, among the many FFDs, an FFD operating so that other devices can configure a network is referred to as a PAN coordinator. The PAN coordinator may also be referred to as an MBAN coordinator, a PAN MBAN coordinator, and so on. And, hereinafter, for simplicity, the PAN coordinator will be collectively referred to as a 'coordinator'. Accordingly, the above-described network topology may be configured based upon the FFD, which performs the function of the coordinator.

Conversely, the RFD performs a fewer number of functions as compared to the number of functions that can be performed by the FDD. Most particularly, counterpart devices that can communicate with the RFD are only limited to FFDs. Therefore, the RFD cannot perform the functions of the coordinator. By assigning all network functions to the FFD, the RFD may have a stack structure of a smaller size, thereby being capable of saving operation (or calculation)/memory resources. Most particularly, since the RFD can locate a coordinator and transmit data thereto and then immediately disconnect itself so as to enter a Power Saving mode (or Sleep mode), the amount of consumed power may be very small, and, therefore, the RFD may be operated for a long period of time with the power of its battery.

Referring to FIG. 1, a device being indicated as "F" represents the FFD, a device being indicated as "R" represents the RFD, and a device being indicated as "P" represents an FFD performing the roles of a coordinator.

In the star topology shown in (a) of FIG. 1, only the communication between the device and the coordinator may be established. At this point, the devices may correspond to a starting point or an ending point of the communication, whereas the coordinator may correspond to a starting point, an ending point, or a router.

In the peer-to-peer topology shown in (b) of FIG. 1, the communication between the device and the coordinator is performed in accordance with at least one or more hops using intermediate devices (or middle devices), which function as relays. Herein, each device may perform communication with any one of the devices existing in the network. Therefore, a network having a more complicated structure, such as a mesh network, may be configured. Herein, the coordinator functions as an access point to upper (or higher-level) layers, and, in case of a Wireless Sensor Network (WSN), the coordinator functions as a sync for data being collected by sensors.

Additionally, the star network may operate the devices so that the durability of the battery may be maintained for a long period of time, and, since the Peer to Peer network may configure at least one or more data delivery paths, the Peer to Peer network may have higher data reliability and higher access recognition rate.

Moreover, the star topology has an extremely limited communication range respective to each device (e.g., several meters), and the peer-to-peer topology allows a larger area to be covered. Since a topology can be dynamic (or mobile), the topology varies when devices are added or leave the network.

For example, in case of the MBAN, when a coordinator is provided to each patient location (e.g., hospital bed), the star topology may be appropriate for a situation, wherein the coordinator exchanges a signal with devices respective to one patient. The peer-to-peer topology may correspond to a more appropriate topology, wherein one coordinator is being provided to serve multiple patients (e.g., the coordinator may be located at a fixed position within the hospital).

Therefore, as opposed to the devices, which are generally provided with mobility, the coordinator may either be mobile or stationary. The peer-to-peer topology may be more appropriate for a quickly changing environment, which requires the network to be quickly set up or changed, or which requires self-organisation and self-healing of the network to be allowed. For example, self-healing may include establishing a new coordinator, when an already-existing coordinator is out of order or has left the network.

Multiple star and/or peer-to-peer topologies, wherein each device has its own coordinator, may be set up within a same location, such as a hospital. In this case, individual coordinators may cooperate in order to avoid interference with one another and to allow sharing or collation of data. In the IEEE 802.15.4 system, such network is referred to as a 'cluster', and a provision for dividing and combining clusters may be realized.

Figure 2:
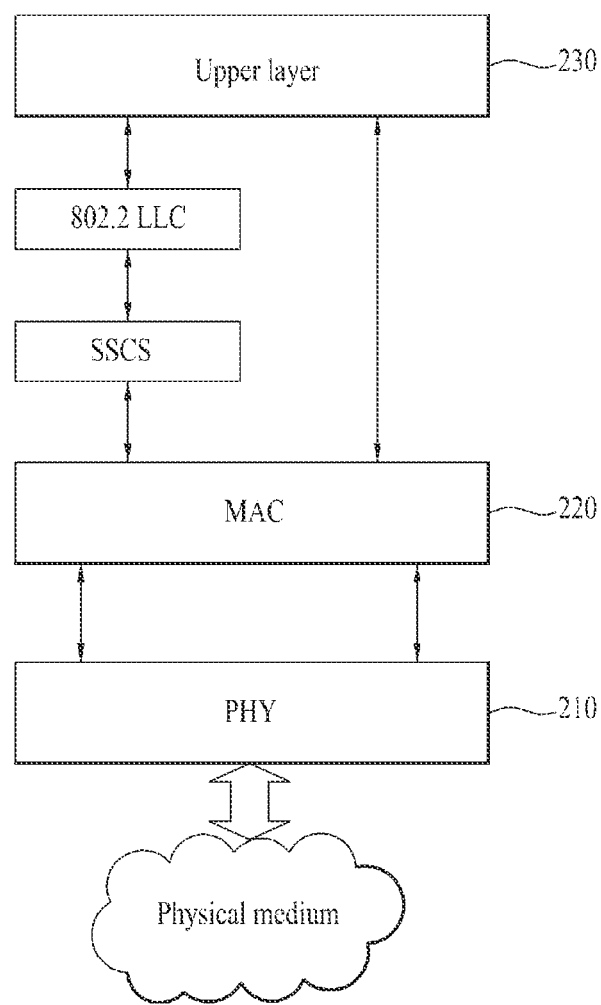
FIG. 2 illustrates a protocol stack of the IEEE 802.15.4 system.

FIG. 2 illustrates a protocol stack of the IEEE 802.15.4 system.

Referring to FIG. 2, the protocol stack may consist of a PHY layer (Physical layer), a MAC layer (Medium Access Control layer), and an Upper layer.

The PHY layer includes an RF transceiver (or transmitter/receiver) and a related control mechanism. The PHY layer may provide a PHY data service transceiving (or transmitting/receiving) PHY PDUs (Protocol Data Units) through a physical channel and a PHY management service for managing the PHY layer.

The MAC layer provides access to a physical channel for data transmission. The MAC layer may provide a MAC data service transceiving (or transmitting/receiving) MAC PDUs (Protocol Data Units) through a physical channel and a MAC management service for performing MAC layer management. The MAC layer may perform functions, such as beacon management, channel access, GTS management, frame verification, security functions, and so on.

The Upper Layer is configured of a Network Layer and an Application Layer. The network layer provides functions, such as network configuration, processing, message routing, and so on. The application layer provides the functions targeted by the device. For example, depending upon the type of the program installed therein. i.e., depending upon the type of the program processing the data of the application layer, a device of the IEEE 802.15.4 system may perform as an RFD (Reduced Function Device), an FFD (Full Function Device), or a coordinator.

Figure 3:
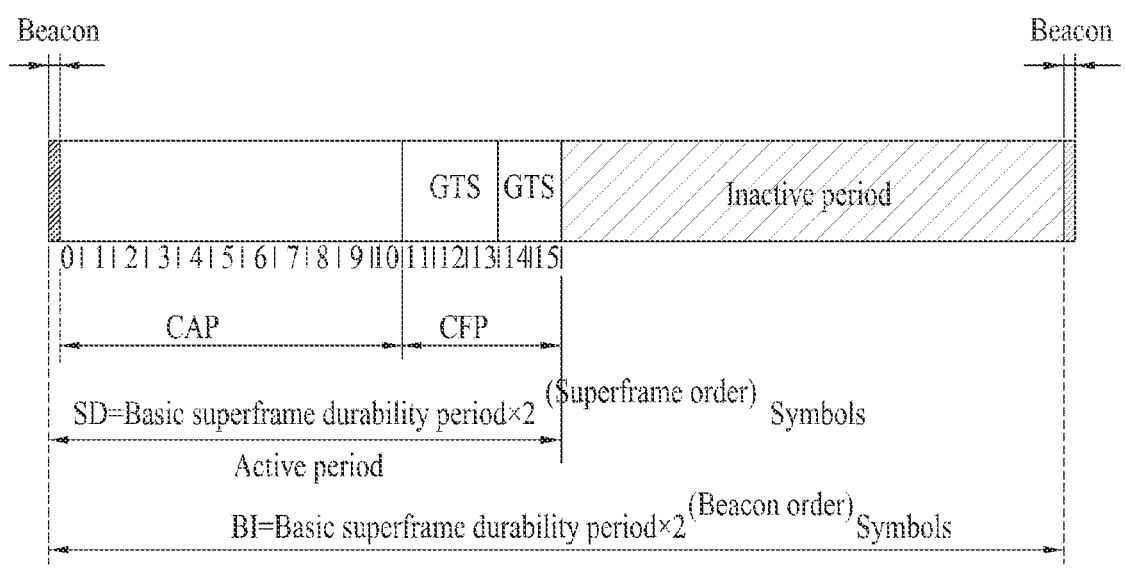
FIG. 3 illustrates a superframe structure of the IEEE 802.15.4 system.

FIG. 3 illustrates a superframe structure of the IEEE 802.15.4 system.

The IEEE 802.15.4 system may be divided into a beacon-enabled operation, wherein the network is operated based upon a beacon that is periodically broadcasted, and a non beacon-enabled operation, wherein the network is operated by non-periodically requesting for a beacon in order to perform communication frame exchange.

In the beacon-enabled network, the coordinator periodically transmits a beacon, and the devices periodically listens to (or receives) the beacon in order to be synchronized to the network and to access channels. As shown in FIG. 3, channel access is sequentially transmitted in frame units within a superframe in accordance with a superframe structure, which is defined by the coordinator.

The superframe may be configured to have a structure including a plurality of time slots (e.g., 16 time slots) in order to transceive (transmit and receive) data between beacon frames being transmitted by the coordinator. Additionally, each superframe may be configured to include an active period and an inactive period due to a requirement for low-power operation between the beacon frames. The active period corresponds to a period, wherein data transception is performed between the devices, and the active period is configured of time slots for frames being used to perform data transception. Conversely, the inactive period refers to a period, wherein data transception is not performed between the devices. More specifically, during the inactive period, the coordinator may enter a low-power mode (or sleep mode).

A ratio between the active period and the inactive period may be referred to as a duty cycle, and the value of the duty cycle may be adjusted based upon requirements for the low-power operation and also based upon requirements for the co-existence of communication methods using the same physical transmission (or transport) channel.

The active period may be configured to include a Contention Access Period (CAP) and a Contention Free Period (CFP), which follows the CAP for an ensured access of applications having service quality requirements.

The CAP is configured of time slots enabling devices participating in a network to perform contention-based transmission of data frames. Therefore, in case of a device that intends to perform communication by using time slots belonging to the CAP, which is located between the two beacon frames, the corresponding device is in a contention-based relation with another device by using the CSMA-CA (Carrier Sense Multiple Access/Collision Avoidance) method.

The CFP is configured of GTSs (Guaranteed Time Slots), which correspond to time slots being allocated (or assigned) to allow a specific device to transmit data frames. The GTS may be used for a low-latency application program (or application program having a fast response speed) or for an application program requiring a specific transmission bandwidth within the device. The CFP is located after the CAP within the superframe, and the CFP may be configured to include up to a maximum limit of 7 GTSs. Additionally, the CFP may also be configured to have multiple GTS to be assigned (or allocated) to a single device.

The coordinator decides to which device each GTS within the CFP is to be allocated (or assigned). The GTS allocation information of the CFP, which is decided by the coordinator, may be transmitted while being included in a beacon frame, which corresponds to the very first slot of the superframe.

Conversely, in the non beacon-enabled network, for example, unless a beacon is requested for a reason, such as a purpose of network discovery, the coordinator does not transmit a beacon for synchronization. Channel access is not limited only to a superframe structure, and, since the devices are asynchronous, all data transmission is performed by CSMA-CA. This may allow devices, which do not have data to be transmitted, to be maintained in the Sleep mode for most of the time, and by having the coordinator place a wake-up preamble in front of each data frame, the coordinator may follow its own sleep pattern in accordance with a predetermined protocol, such as a sensor-MAC (WiseMAC), which ensures the receiving device to be active when data reach the device.

As described above, the coordinator within the beacon-enabled network performs the function of providing synchronization and channel access to the network devices. Additionally, a starting point and ending point of a superframe is defined by the coordinator. The coordinator has two characteristics, one being potential communication with other networks, and the other being, for example, access to sufficient power supply due to an easy replacement of a charged battery.

Figure 4:
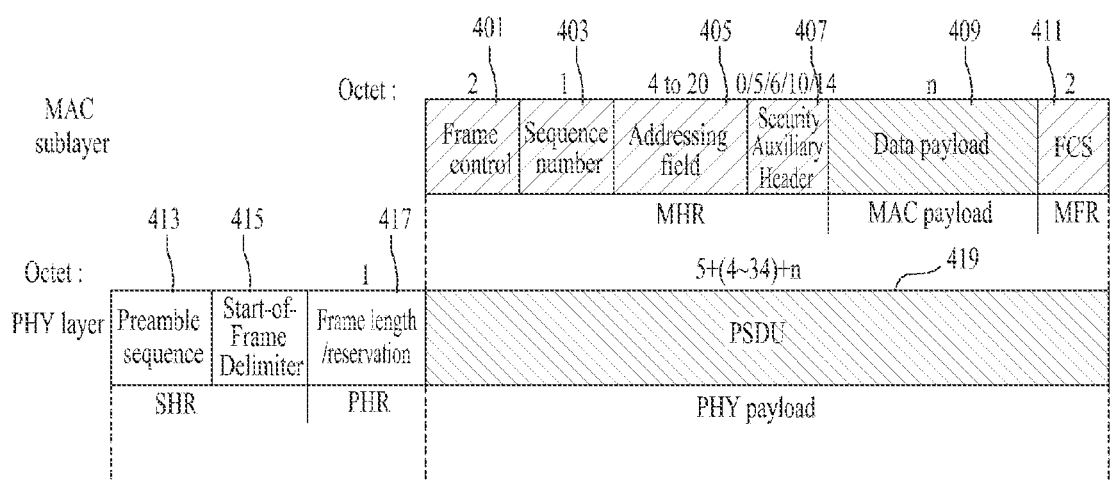
FIG. 4 illustrates an example of each frame format within a MAC layer and a PHY layer in the IEEE 802.15.4 system.

FIG. 4 illustrates an example of each frame format within a MAC layer and a PHY layer in the IEEE 802.15.4 system.

Referring to FIG. 4, the frame format in a MAC layer consists of a MAC header (MHR), a MAC payload, and a MAC footer (MFR). The MHR, MAC payload, and MFR configure one MAC data frame, i.e., one MAC protocol data unit (MPDU).

The MHR includes a Frame Control field (401), a Sequence Number field (403), an Addressing Field (405), and an Auxiliary Security Header field (407).

Among the fields configuring the MHR, the Frame Control field (401) includes a value indicating a frame format type (or kind), the Sequence Number field (403) includes a current value of a macDSN, and the Addressing Field (405) may include a receiving and/or transmitting address. Additionally, the Auxiliary Security Header field (407) may include information required for performing security processing of the frame.

Although it is not shown in the drawing, the MAC payload may be configured to include a Command Frame Identifier and a Command Payload. Additionally, the MFR may be configured to include a Frame Check Sequence (FCS) (411). The FCS (411) may be used to determine whether or not an error occurs in data transmission respective to the MHR and MAC payload portions.

The IEEE 802.15.4 network accompanies four different types of frames, such as a beacon frame being used by the coordinator in order to transmit a beacon, a data frame being used in order to transmit data, an acknowledgement frame being used in order to verify a successful frame reception, and a MAC command frame being used in order to handle all types of MAC peer entity control transmission, such as a data request. Herein, with the exception for the fact that each of the beacon frame, the acknowledgement frame, and the MAC command frame has a different MAC payload, and the fact that the acknowledgement frame does not have a MAC payload, the beacon frame, the acknowledgement frame, and the MAC command frame have similar structures. Moreover, the beacon frame, the acknowledgement frame, and the MAC command frame may originate from a MAC sub-layer without any involvement of other higher layers.

Meanwhile, the MPDU is transmitted to a PHY layer as a PHY Service Data Unit (PSDU), and this becomes a PHY payload within the PHY layer. A synchronization header (SHR), which includes a preamble sequence (413) and a Start-of-Frame Delimiter (SFD) (415), and a PHY header (PHR), which includes a frame length/reservation (417) indicating the length of the PHY payload in octet units, are located in front of the PHY payload. The preamble sequence (413) and the data SFD (415) enable the receiver to achieve symbol synchronization. Such SHR, PHR, and PHY payload configure one PHY packet, i.e., a PHY protocol data unit (PPDU).

FIG. 5 illustrates an example of a beacon frame format of the IEEE 802.15.4 system.

Referring to FIG. 5, the beacon frame includes an MHR, a MAC payload, and an MFR.

The MHR includes a Frame Control field (501), a Sequence Number field (503), an Addressing Field (505), and an Auxiliary Security Header field (507). And, the MAC payload of the beacon frame may include a Superframe specification field (509), GTS fields (511), Pending Address fields (513), and a Beacon Payload field (515). Additionally, the MFR may be configured to include a frame check sequence (FCS) (517).

The Superframe specification field (509) may include information on beacon order, superframe order, a last CAP slot, a CAP, a CFP, an active period length, battery durability, whether or not transmission is performed by the coordinator, and so on. However, the diverse information mentioned above is merely exemplary, and, therefore, the information being included in the Superframe specification field (509) may be varied.

Although it is not shown in the drawing, the GTS fields (411) may include a GTS specification field, a GTS Direction field, and a GTS List field. Additionally, the Superframe specification field may include a GTS descriptor count subfield. The GTS descriptor count subfield indicates a number of GTS descriptors that are to be included in the GTS List field. For example, in case the size of the GTS descriptor count subfield is equal to 3 bits, the GTS List field may include a maximum of 7 GTS descriptors. And, the GTS Direction field may include a GTS Directions Mask subfield, which indicates the direction of GTSs within the subframe. More specifically, the GTS Directions Mask subfield may respectively indicate whether each GTS corresponds to a data transmit-only GTS or a data receive-only GTS. And, the GTS List field may include a GTS descriptor field indicating GTS allocation information. As described above, the GTS List field may include one or more GTS descriptor fields in accordance with a value indicated by the GTS descriptor count subfield. Additionally, whether each GTS descriptor field is being used for transmitting data or for receiving data may be decided by the GTS Directions Mask subfield.

More specifically, although each of the GTS descriptor fields included in the GTS List field is not shown in the drawing, each GTS descriptor field may be configured to include a Device Short Address field, a GTS Starting Slot field, a GTS Length field, a Start Sequence Number field, a GTS Interval field, and a GTS Window field.

The Device Short Address field indicates the address of devices having the GTS allocated thereto by the GTS descriptor. More specifically, in case a GTS associated with the GTS descriptor field is allocated to the device, the Device Short Address field is assigned with the address of the device. The GTS Starting Slot field indicates information on a Superframe slot in which the GTS starts. The GTS Length field indicates a number of GTSs that are contiguously (or serially) activated within the superframe. The GTS Interval field indicates a value designating a number of superframes after which the GTS is to be allocated. The GTS Interval field may be assigned with a value indicating the superframe interval at which the GTS is allocated or may be assigned with a value of a specific time at which the GTS is allocated. The GTS Window field indicates a value indicating a range within which the GTS can be allocated before and after the superframe, which is designated by the GTS Interval field.

Figure 6:
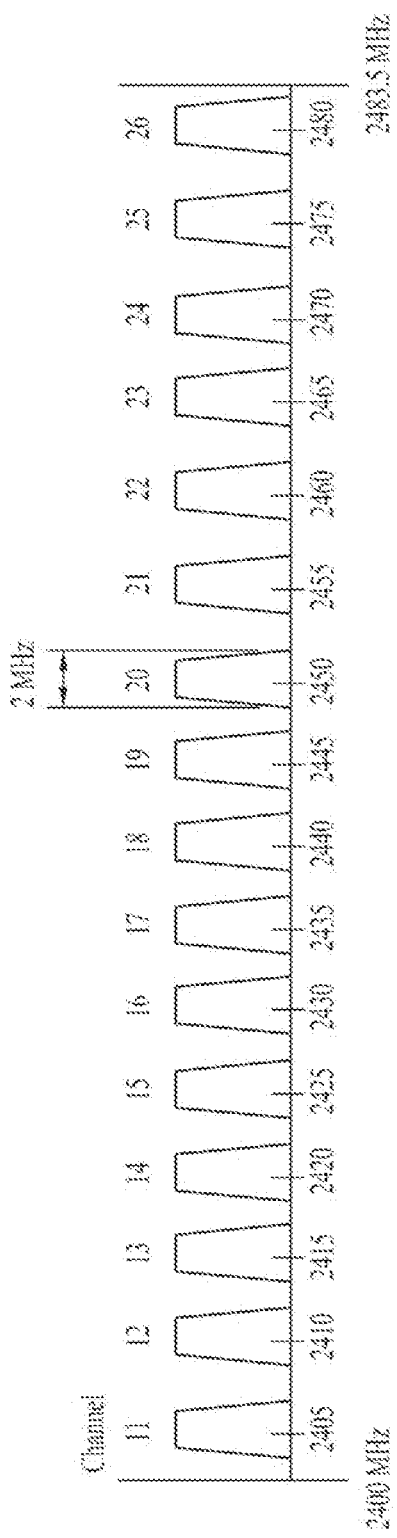
FIG. 6 illustrates a channel alignment of the IEEE 802.15.4 system.

FIG. 6 illustrates a channel alignment of the IEEE 802.15.4 system.

Referring to FIG. 6, the IEEE 802.15.4 system operating in a 2400 MHz band has a channel spacing interval of 5 MHz.

An MBAN system based upon the IEEE 802.15.4 system uses a 2360~2390 MHz band and a 2390~2400 MHz band. The 2360~2390 MHz band may be used when the MBAN device is allocated with a channel from an MBAN coordinator and operated accordingly within a healthcare facility. And, the 2390~2400 MHz band may be used when the MBAN device can no longer receive any information on a MBAN channel from the MBAN coordinator, or when the MBAN device and coordinator are operated outside of the healthcare facility. Additionally, the 2390~2400 MHz band may also be used as a basic channel band of the MBAN system.

Figure 7:
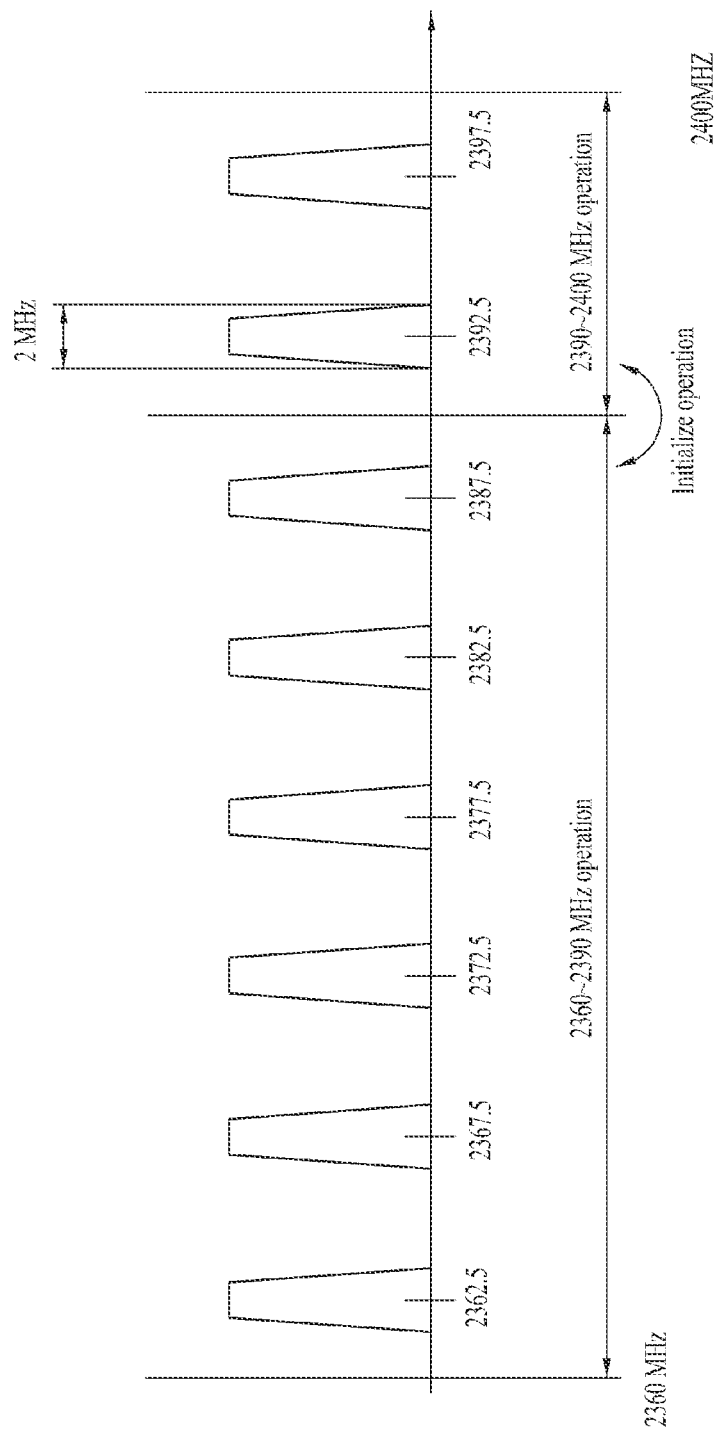
FIG. 7 illustrates an exemplary MBAN system channel alignment.

FIG. 7 illustrates an exemplary MBAN system channel alignment.

FIG. 7 shows available channels of the MBAN within the 2360~2400 MHz band. The MBAN device operating in the 2360~2400 MHz band may occasionally be required to change the operating channel from a channel of the 2360~2390 MHz band to a channel of the 2390~2400 MHz band, or vice versa. Apart from an MBAN system having first-priority right to user the corresponding band, in case a primary user of a wireless communication system is required to use a channel of the 2360~2390 MHz band, the device of the MBAN system is required to perform operating channel switching to a channel of the 2390~2400 MHz band. As described above, in case the operating channel is switched, the device of the MBAN system performs operation defaulting and then performs channel switching.

2. Channel Switching Method

The present invention relates to a wireless communication system and, more particularly, to a procedure for transmitting channel switching parameters in an MBAN system and a related frame.

As described above, when the MBAN system has channel switched from a 30 MHz band to a 10 MHz band, it is not preferable to continue to use the channel of the 10 MHz band, since such usage may cause a considerable amount of load to the 10 MHz band. Therefore, it is preferable to channel switch back to the 30 MHz band after a predetermined period of time. However, in order to establish association once again with the network of the 30 MHz band, which was used prior to the channel switching, a channel scanning process is required to be repeatedly performed with respect to all channels at constant time intervals. In order to resolve such problems, the present invention proposes a method for reducing power consumption by allowing required information to be exchanged between the coordinator and the device in advance during the channel switching procedure, which will be described below, thereby removing unnecessary operations.

2.1 Channel Switching Information

For easy channel switching of the device, the coordinator may transmit channel switching information to the device. The channel switching information informed by the coordinator to the device may be configured of the following Channel switching parameter field.

Figure 8:
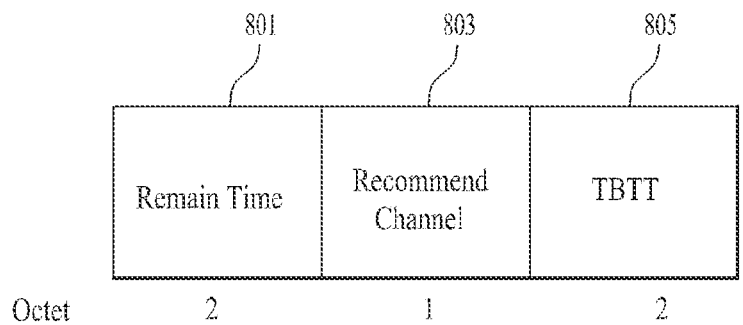
FIG. 8 illustrates an example of a channel switching parameter field according to an exemplary embodiment of the present invention.

FIG. 8 illustrates an example of a channel switching parameter field according to an exemplary embodiment of the present invention.

Referring to FIG. 8, the channel switching parameter field may include a Remain Time field (801), a Recommend Channel field (803), and a TBTT (Target Beacon Transmission Time) field (805). Herein, the Recommend Channel field may be configured of information indicating a channel number of another frequency band to which channel switching is performed (e.g., Channel Number field) or information indicating a channel page (e.g., Channel Page field). Additionally, although it is not shown in the drawing, the Recommend Channel field may further include identifier information of a PAN existing in a channel to which the device has shifted via channel switching (e.g., PAN identifier (PAN ID) field) or coordinator address information for establishing association in the corresponding channel band (e.g., Coordinator Address field). The Coordinator Address refers to address information of a coordinator operating in a channel, which is specified by the above-described Recommend Channel field (or Channel Number field and Channel Page field), and the identifier of the PAN refers to a PAN identifier of such coordinator. Herein, the coordinator address may be indicated by any one of a short address of the coordinator or an extended address of the coordinator. Additionally, the coordinator that is currently associated with a device may be aware of which coordinator the corresponding device was associated with prior to the channel switching.

Each of the fields shown in FIG. 8 is merely an exemplary field included in the channel switching information. And, the channel switching information may be configured to include at least any one of the fields shown in FIG. 8. Additionally, the order of each field or the size of each field configuring the channel switching information may be changed.

The Remain Time field (801) refers to a time remaining for the device to shift (or switch) from a 30 MHz band to a 10 MHz band or from a 10 MHz band to a 30 MHz band. At this point, the Remain Time field (801) may calculate a time period starting from a point when the device has shifted (or switched) from a 30 MHz band to a 10 MHz band or from a 10 MHz band to a 30 MHz band, and the Remain Time field (801) may also calculate a time period starting from a point when the corresponding channel switching parameter field has been transmitted to the device. Herein, the Remain Time field (801) may be indicated in units of seconds, minutes, hours, or a number of frames or superframes, and so on.

The Recommend Channel field (803) refers to a channel that is to be shifted (or switched) from a 30 MHz band to a 10 MHz band or from a 10 MHz band to a 30 MHz band and operated accordingly. At this point, the Recommend Channel field (803) may refer to a specific channel. However, the Recommend Channel field (803) may also refer to a channel set including at least any one of the one or more channels. The coordinator that is currently associated with a device may be aware of the operating channel of the device in the 30 MHz band or the 10 MHz band prior to being channel switched to the current operating channel band.

The TBTT field (805) notifies a prearranged transmission time of a beacon frame within an operating channel to which the device is shifted. More specifically, the TBTT field (805) refers to a prearranged transmission time of a beacon frame in an operating channel, which is designated by the Recommend Channel field (803). The device uses the TBTT field (805), which is received from the coordinator, so as to receive a beacon frame at a decided time in order to establish association with a coordinator of the channel, which is switched via channel switching. At this point, the TBTT field (805) may further include information on a cycle period according to which the beacon frame is being transmitted from the switched channel.

More specifically, the TBTT field (805) may refers to a specific time scheduled (or prearranged) to have a beacon frame transmitted from a channel, which is being switched by channel switching. In other words, a prearranged time at which the beacon frame is to be transmitted may be indicated in units of specific hours, minutes, and seconds, and the prearranged time may also be indicated as an index of a specific superframe or frame.

Furthermore, the TBTT field (805) may calculate a time period starting from a time point at which the remaining time is ended. More specifically, the TBTT field (805) may refer to a time interval starting from the time point, at which the remaining time is ended, up to the transmission of a first beacon frame generating from the channel band to which the device switches via channel switching. Additionally, the TBTT field (805) may also calculate a time period starting from a time point at which the corresponding channel switching parameter field is transmitted to the device. More specifically, the TBTT field (805) may refer to a time interval starting from the time point, at which the channel switching parameter field is transmitted to the device, up to the transmission of a first beacon frame generating from the channel band to which the device switches via channel switching. As described above, in case the prearranged transmission time of the beacon frame is notified to the device as a time point relative to the time point at which the remaining time is ended, or the time point at which the channel switching parameter field is transmitted to the device, the TBTT field (805) may be indicated in units of seconds, minutes, hours, or a number of frames or superframes, and so on.

The channel switching information may be transmitted to the device by using a broadcast, multicast, or unicast method. The broadcast method may be performed as a transmission method including the channel switching information in the beacon frame. The unicast method may be performed by separately defining a command or frame for channel switching. For example, the separately defined command or frame may be referred to as a Channel switch notification command, a Channel switching parameter response frame, and so on.

As described above, the device that has received the channel switching information may perform channel switching to a recommended channel after a remaining time. Then, after being operated in the sleep mode, the device wakes up at a TBTT time period and receives a beacon, thereby establishing an association with a coordinator of the corresponding channel.

2.2. Channel Switching Procedure 1

Figure 9:
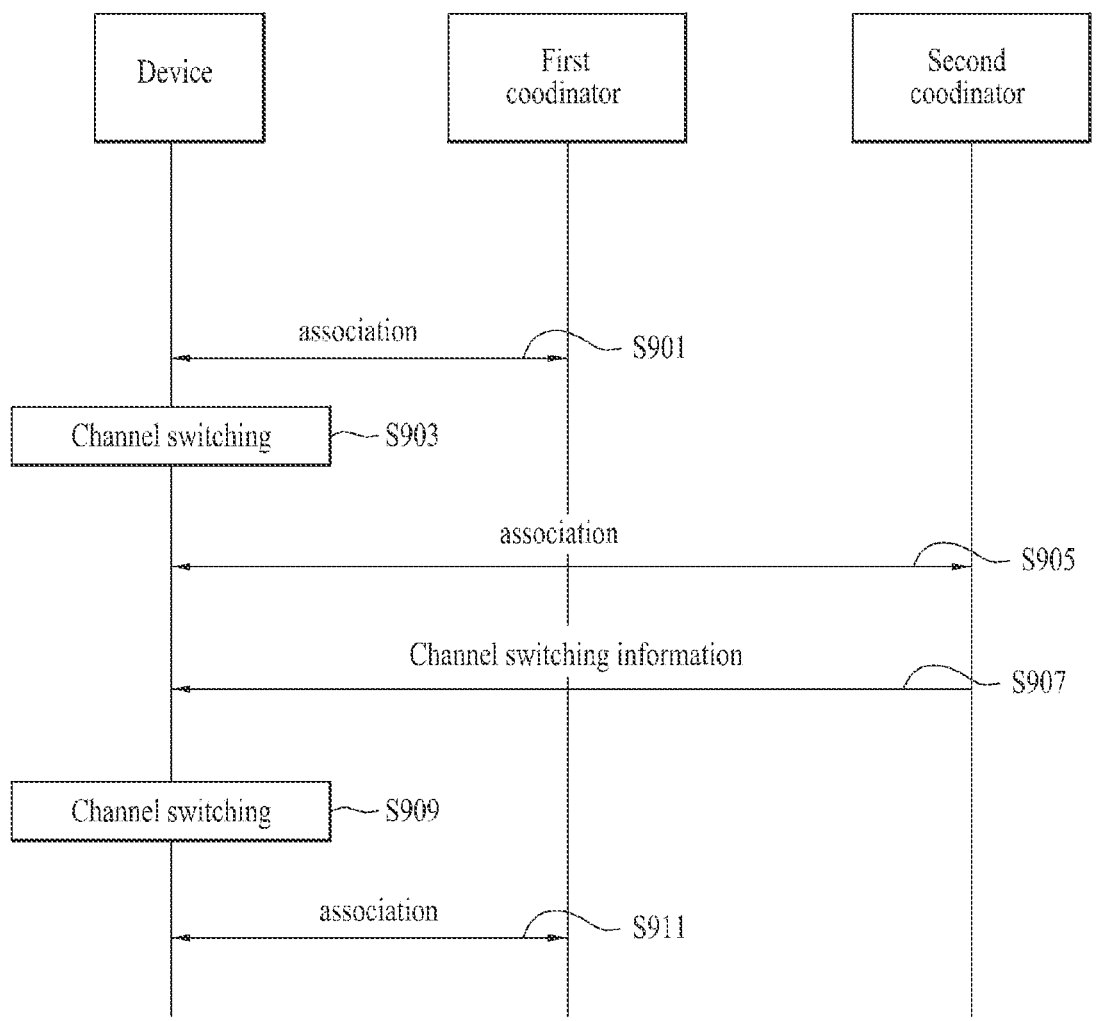
FIG. 9 illustrates a channel switching procedure according to an exemplary embodiment of the present invention.

FIG. 9 illustrates a channel switching procedure according to an exemplary embodiment of the present invention.

Hereinafter, for simplicity in the description, it will be assumed that the 2360~2390 MHz band of the MBAN system corresponds to a first frequency band, and it will also be assumed that the 2390~2400 MHz band of the MBAN system corresponds to a second frequency band. However, the present invention will not be limited only to this. And, therefore, the first frequency band may correspond to the 2390~2400 MHz band, and the second frequency band may correspond to the 2360~2390 MHz band.

Referring to FIG. 9, a first coordinator and the device establish association between one another through any one channel among the first frequency band channels (S901). Having established association with the first coordinator, the device may transceive (transmit and receive) data with the first coordinator.

At this point, a case when the device, which is transceiving data with the first coordinator, is required to switch the current operating channel to a channel of another frequency band may occur. For example, when a primary user of a wireless communication system other than the MBAN system is required to use the 2360~2390 MHz band, or when the device is moved outside of a designated area (e.g., when the device is moved outside of the healthcare facility), the device switches to a channel of the 2390~2400 MHz band and shall transceiver (transmit and receive) data with the coordinator of the switched channel, i.e., the second coordinator.

As described above, information notifying channel status of each frequency band, i.e., information notifying which channels of the 2360~2390 MHz band and the 2390~2400 MHz band of the MBAN can be used and when such channels can be used, may be collected and managed by a controller controlling multiple coordinators. The controller may be configured to include a DB (Data Base) storing and managing channel status of each frequency band and an MBAN control point managing the DB. In a situation when the above-described channel switching is required, information related to the usage of each channel of the second frequency band in order to allow the device to channel switch and transceive (transmit and receive) data is delivered from the controller to the first coordinator.

The device receives the information related to channel switching to the second frequency band from the first coordinator and performs channel switching based upon the received channel switching information (S903). Herein, the channel switching information may include a channel number of the second frequency band to which the device is to switch, a time at which switching is to be performed, a coordinator identifier of the second frequency band to which switching is to be performed.

Subsequently, after performing channel switching, the device establishes association with a second coordinator (S905). After establishing association with the second coordinator, the device may transceive (transmit and receive) data with the second coordinator.

As described above, after the device performs channel switching from the first frequency band to the second frequency band, since a continued usage of the channel of the second frequency band may cause a load to the second frequency band, it will be preferable to switch back to the first frequency band after a predetermined period of time. Additionally, a situation where channel switching is required to be performed from the second frequency band back to the first frequency band may occur, such as a case when the usage of the primary user of the first frequency band is ended. In case of a situation where such channel switching is possible, information related to the usage of each channel of the initial frequency band (first frequency band) may be delivered to the second coordinator from the controller.

After receiving the channel information of the first frequency band from the controller, the second coordinator transmits information related to the channel switching to the device based upon the received channel information (S907). At this point, the second coordinator may transmit the channel switching information to the device by using a broadcast, multicast, or unicast method, and since the description of the channel switching information is identical to the description provided above (2.1.), a detailed description of the same will be omitted.

As an example of the second coordinator transmitting the channel switching information, in order to transmit the channel switching information to the device, the second coordinator may use a beacon frame, which is periodically broadcasted in step S907.

Figure 10:
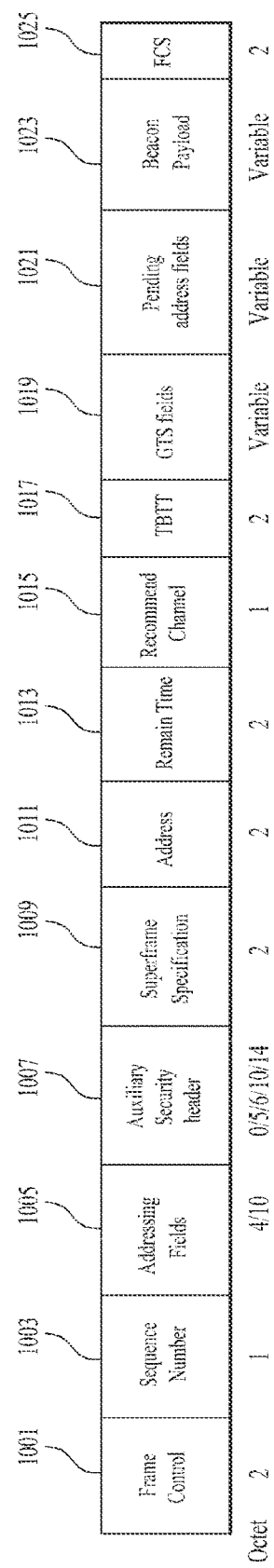
FIG. 10 illustrates an example of a beacon frame according to an exemplary embodiment of the present invention.

FIG. 10 illustrates an example of a beacon frame according to an exemplary embodiment of the present invention.

Referring to FIG. 10, a beacon frame may be generated from the second coordinator, which has received information related to the switching to the first frequency band from the MBAN controller, the MBAN control point, and so on.

In case the beacon frame is being used as a broadcast message, the beacon frame may include a channel switching parameter field according to FIG. 8. More specifically, the beacon frame may include at least any one of a Remain Time field (1013), a Recommend Channel field (1015), and a TBTT field (1017) respective to the beacon transmission time from a channel of the first frequency band. At this point, the Recommend Channel field may be configured of a Channel Number field and a Channel Page field.

Additionally, the second coordinator may include an address field (1011) of a device requiring channel switching in the beacon frame and may transmit the processed beacon frame. As described above, since the beacon frame is transmitted by using the broadcast method, identifier information of the corresponding device may be included in the address filed (1011) in order to specify the device requiring channel switching. At this point, identifier information respective to one or more devices may be included in the address field (1011), and, for example, an identifier respective to a group in order to collectively specify devices, which are grouped in accordance with a specific condition, may also be included in the address field (1011).

Additionally, although it is not shown in FIG. 10, the beacon frame may further include a Coordinator Address field of a coordinator operating in a channel of the first frequency band, to which the device has shifted by performing channel switching, or a PAN identifier (PAN ID) of the corresponding coordinator. This is to enable the device to perform active scanning, so as to be capable of swiftly performing a procedure for establishing association with a coordinator existing in the channel of the first frequency band. More specifically, if multiple coordinators exist in the first frequency band, or if a coordinator having an unknown address (or identifier) exists in the first frequency band, the device may swiftly perform channel switching by using the received coordinator address information. At this point, the coordinator address (or identifier), which is included in the channel switching information, may be decided based upon an estimated movement status of the device, an alignment of neighboring coordinators, and so on.

Referring back to FIG. 9, the device performs channel switching based upon the received channel switching information (S909). More specifically, the device performs channel switching to a recommended channel after the remaining time based upon the channel switching information.

After performing channel switching, the device establishes (or sets up) an association within the first coordinator based upon the channel switching information (S911). More specifically, after being operated in the sleep mode, the device that has performed channel switching wakes up at a TBTT time period and receives a beacon, so as to establish an association with a coordinator operating in the corresponding channel. After establishing the association with the first coordinator, the device may hereinafter transceive (transmit and receive) data with the first coordinator.

As described above, by using the channel switching information provided by the coordinator, the device is no longer required to periodically perform scanning on all channels in order to find the initial network within the first frequency band. Thus, power consumption of the device may be reduced, and radio resources may be used more efficiently.

2.3. Channel Switching Procedure 2

Figure 11:
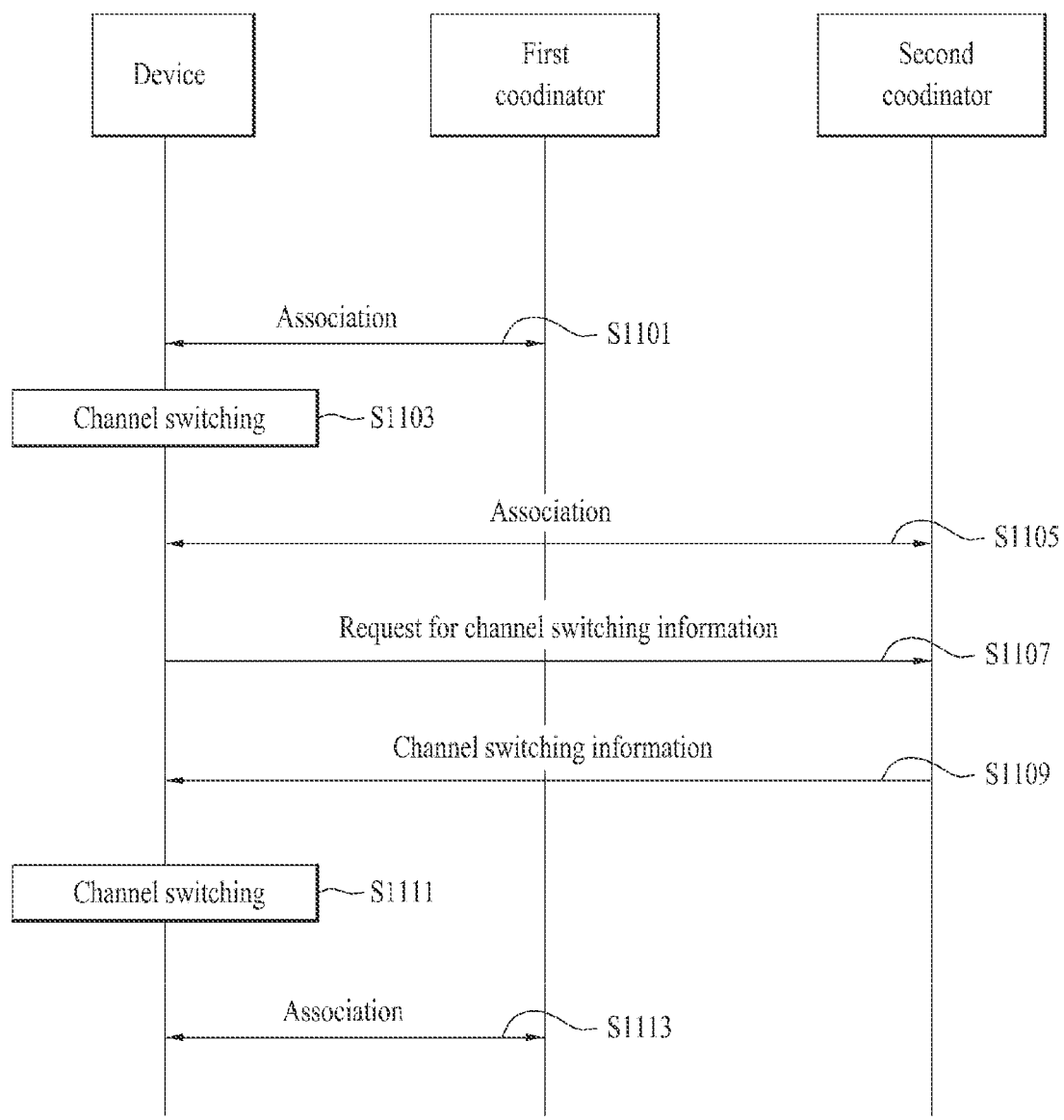
FIG. 11 illustrates a channel switching procedure according to an exemplary embodiment of the present invention.

FIG. 11 illustrates a channel switching procedure according to an exemplary embodiment of the present invention.

Hereinafter, for simplicity in the description, it will be assumed that the 2360~2390 MHz band of the MBAN system corresponds to a first frequency band, and it will also be assumed that the 2390~2400 MHz band of the MBAN system corresponds to a second frequency band. However, the present invention will not be limited only to this. And, therefore, the first frequency band may correspond to the 2390~2400 MHz band, and the second frequency band may correspond to the 2360~2390 MHz band.

Referring to FIG. 11, since the process steps S1101 to S1105 are identical to the process steps S901 to S905 according to FIG. 9, detailed description of the same will be omitted.

After performing channel switching from the first frequency band to the second frequency band, the device requests for channel switching information to the second coordinator (S1107). Even if the channel switching information is transmitted through the beacon frame, if the cycle period according to which the beacon frame is being transmitted is excessively long, or if the user equipment fails to receive the channel switching information being transmitted through the beacon frame, and so on, the device may request for information related to channel switching to the second coordinator. Herein, due to the channel switching process, the device may additionally request for channel switching information during the process of establishing association with the second coordinator, which belongs to the second frequency band. And, after completing the process of establishing association, the device may request for the channel switching information. Additionally, after performing channel switching to the second frequency band, after a predetermined period of time, or if the device fails to receive the beacon frame for more than a predetermined period of time (or a predetermined number of attempts), the device may request for the channel switching information to the second coordinator.

As an example of the device requesting for channel switching information to the second coordinator, in order to request for the channel switching information to the second coordinator, the device may use a channel switching parameter request frame in step S1107.

Figure 12:
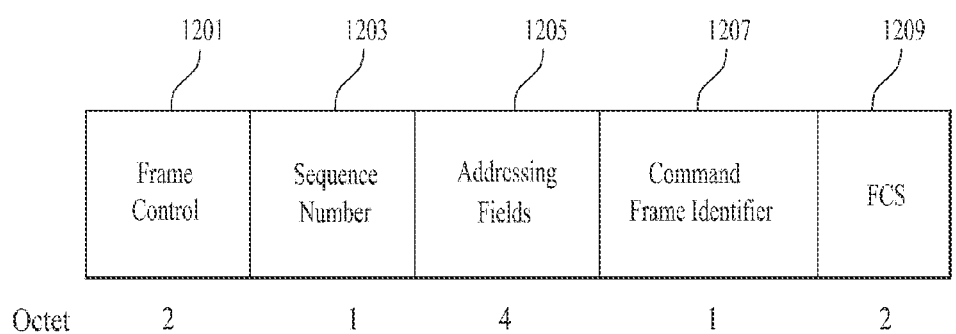
FIG. 12 illustrates an example of a channel switching parameter request frame according to an exemplary embodiment of the present invention.

FIG. 12 illustrates an example of a channel switching parameter request frame according to an exemplary embodiment of the present invention.

Referring to FIG. 12, the channel switching parameter request frame may include a Frame Control field (1201), a Sequence Number field (1203), an Addressing Field (1205), and a Command Frame Identifier field (1207), and a Frame Check Sequence (FCS) (1209).

The frame type of the channel switching parameter request frame may correspond to a MAC command frame type, and the device may define the command frame identifier field (1207) to have a predetermined value, so as to indicate that the corresponding field is a message requesting for the channel switching information by the user equipment. For example, among the values of the command frame identifier field (1207), by using a reserved value '0x0a', this may indicate that the command frame identifier field (1207) corresponds to a message requesting for the channel switching information.

Referring back to FIG. 11, the second coordinator that has received the request for the channel switching information transmits the channel switching information to the device (S1109). At this point, as a response to the request for the channel switching information, the second coordinator may transmit the channel switching information to the device by using a broadcast, multicast, or unicast method, and since the description of the channel switching information is identical to the description provided above (2.1.), a detailed description of the same will be omitted.

As an example of the second coordinator transmitting the channel switching information by using the unicast method, in order to transmit the channel switching information to the device, the second coordinator may use a channel switching parameter response frame in step S1109.

Figure 13:
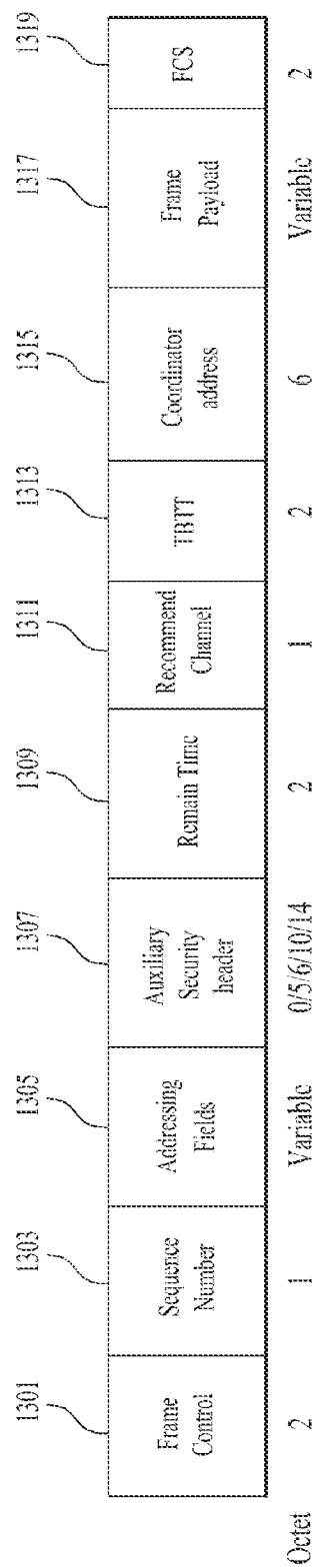
FIG. 13 illustrates an example of a channel switching parameter response frame according to an exemplary embodiment of the present invention.

FIG. 13 illustrates an example of a channel switching parameter response frame according to an exemplary embodiment of the present invention.

Referring to FIG. 13, the channel switching parameter response frame may include a Frame Control field (1301), a Sequence Number field (1303), an Addressing Field (1305), an Auxiliary Security Header field (1307), a Frame Payload field (1317), and a Frame Check Sequence (FCS) (1319). Additionally, the channel switching parameter response frame may include a channel switching parameter field according to FIG. 8. More specifically, the channel switching parameter response frame may include at least any one of a Remain Time field (1309), a Recommend Channel field (1311), and a TBTT field (1313) respective to the beacon transmission time from a channel of the first frequency band. At this point, the Recommend Channel field may be configured of a Channel Number field and a Channel Page field.

Additionally, the channel switching parameter response frame may further include a Coordinator Address field (1315) of a coordinator operating in a channel of the first frequency band, to which the device has shifted by performing channel switching. Moreover, although it is not shown in FIG. 13, the channel switching parameter response frame may further include, or a PAN identifier (PAN ID) of the coordinator, which is indicated by the coordinator address field (1315). This is to enable the device to perform active scanning, so as to be capable of swiftly performing a procedure for establishing association with a coordinator existing in the channel of the first frequency band. More specifically, if multiple coordinators exist in the first frequency band, or if a coordinator having an unknown address (or identifier) exists in the first frequency band, the device may swiftly perform channel switching by using the received coordinator address information. At this point, the coordinator address (or identifier), which is included in the channel switching information, may be decided based upon an estimated movement status of the device, an alignment of neighboring coordinators, and so on.

The frame type of the channel switching parameter request frame may correspond to a MAC command frame type, and the device may define the command frame identifier field to have a predetermined value, so as to indicate that the corresponding field is a message requesting for the channel switching information by the user equipment. For example, among the values of the command frame identifier field, by using a reserved value '0x0b', this may indicate that the command frame identifier field corresponds to a message responding to the request for the channel switching information.

Referring back to FIG. 11, the device performs channel switching based upon the received channel switching information (S1111). More specifically, the device performs channel switching to a recommended channel after the remaining time based upon the channel switching information.

After performing channel switching, the device establishes (or sets up) an association within the first coordinator based upon the channel switching information (S1113). More specifically, after being operated in the sleep mode, the device that has performed channel switching wakes up at a TBTT time period and receives a beacon, so as to establish an association with a coordinator operating in the corresponding channel. After establishing the association with the first coordinator, the device may hereinafter transceive (transmit and receive) data with the first coordinator.

As described above, by using the channel switching information provided by the coordinator, the device is no longer required to periodically perform scanning on all channels in order to find the initial network within the first frequency band. Thus, power consumption of the device may be reduced, and radio resources may be used more efficiently.

3. General Device to Which the Present Invention Can Be Applied

Figure 14:
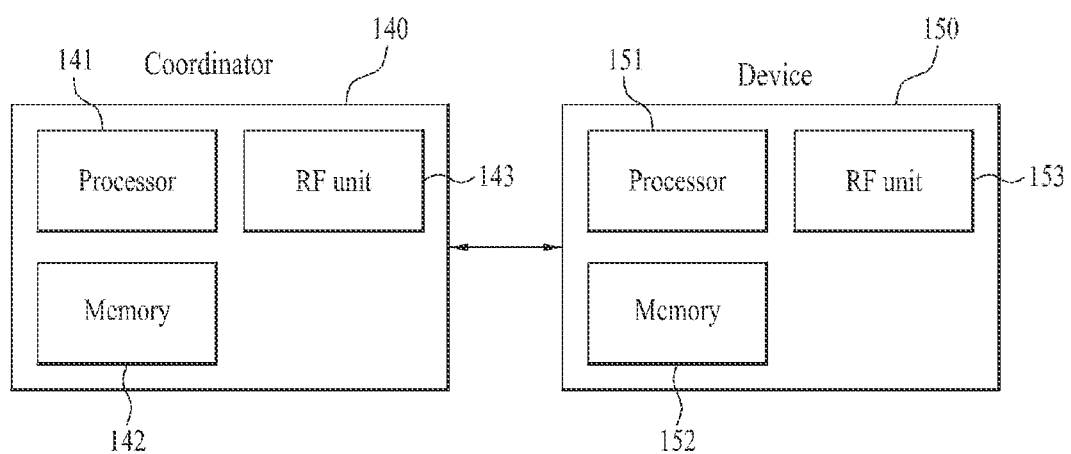
FIG. 14 illustrates a block view of a wireless communication device according to an exemplary embodiment of the present invention.

FIG. 14 illustrates a block view of a wireless communication device according to an exemplary embodiment of the present invention.

Referring to FIG. 14, the wireless communication system includes a coordinator (140) and multiple devices (150) located within a coordinator (140) region.

The coordinator (140) includes a processor (141), a memory (142), and an RF unit (radio frequency unit) (143). The processor (141) realizes the proposed functions, procedures, and/or methods. Layers of a wireless interface protocol may be realized by the processor (141). The memory (142) is connected to the processor (141), so as to store diverse information for operating the processor (141). The RF unit (143) is connected to the processor (141), so as to transmit and/or receive radio signals.

The device (150) includes a processor (151), a memory (152), and an RF unit (153). The processor (151) realizes the proposed functions, procedures, and/or methods. Layers of a wireless interface protocol may be realized by the processor (151). The memory (152) is connected to the processor (151), so as to store diverse information for operating the processor (151). The RF unit (153) is connected to the processor (151), so as to transmit and/or receive radio signals.

The memory (142, 152) may be located inside or outside of the processor (141, 151), and the memory (142, 152) may be connected to the controller (141, 151) through diverse well-known means. Additionally, the coordinator (140) and/or the device may have a single antenna or multiple antenna.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described exemplary embodiments and varied (or modified) embodiments of the present invention may be implemented by using a variety of methods, such as in the form of hardware, firmware, or software, or in a combination of hardware, firmware, and/or software. In case of implementing the exemplary embodiment of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the exemplary embodiment of the present invention in the form of firmware or software, the method according to the embodiments of the present invention may be implemented in the form of a module, procedure, or function performing the above-described functions or operations. A software code may be stored in a memory and driven by a processor. Herein, the memory unit may be located inside or outside of the processor, and the memory may transmit and receive data to and from the processor by using a wide range of methods that have already been disclosed.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

Although the method proposed in the present invention is described based upon an example that can be applied to the IEEE 802.15.4 system, the present invention may be applied in diverse types of wireless access systems in addition to the IEEE 802.15.4 system.

What is claimed is:

1. A method for switching an operating channel of a device in a WPAN (Wireless Personal Area Network) system, the method comprising:
   receiving channel switching information for channel switching related to a first frequency band and a second frequency band through a periodic beacon frame,
   wherein the channel switching information identifies a frequency band for a MBAN (medical body area network) and a channel number corresponding the MBAN; and
   performing a channel switching procedure in a range of 2360 MHz and 2400 MHz according to the received channel switching information,
   wherein the channel switching information further includes a remain time for channel switching relative to the frequency band for the MBAN,
   wherein the periodic beacon frame is configured to being received according to a time interval starting from a time point, at which a remaining time is ended, to a first beacon frame generating from the second frequency band, and
   wherein the periodic beacon frame is configured to include a coordinator address field of a coordinator operation in a channel in a range of 2390 MHz and 2400 MHz, and the coordinator address field is used to perform an active scanning when multiple coordinators exist in the range of 2390 MHz and 2400 MHz.

2. A device configured to switch an operating channel of a device in a WPAN (Wireless Personal Area Network) system, the device comprises:
   an RF (Radio Frequency) unit configured to transmit and receive radio signals; and
   a processor configured to
      receive channel switching information for channel switching related to a first frequency band and a second frequency band through a periodic beacon frame,
      wherein the channel switching information identifies a frequency band for a MBAN (medical body area network) and a channel number corresponding the MBAN; and
      performing a channel switch procedure in a range of 2360 MHz and 2400 MHz according to the received channel switching information,
      wherein the channel switching information includes a remain time for channel switching relative to the frequency band for the MBAN,
      wherein the periodic beacon frame is configured to being received according to a time interval starting from a time point, at which a remaining time is ended, to a first beacon frame generating from the second frequency band, and
      wherein the periodic beacon frame is configured to include a coordinator address field of a coordinator operation in a channel in a range of 2390 MHz and 2400 MHz, and the coordinator address field is used to perform an active scanning when multiple coordinators exist in the range of 2390 MHz and 2400 MHz.

* * * * *